United States Patent
Pivac et al.

(10) Patent No.: US 8,166,727 B2
(45) Date of Patent: May 1, 2012

(54) AUTOMATED BRICK LAYING SYSTEM FOR CONSTRUCTING A BUILDING FROM A PLURALITY OF BRICKS

(75) Inventors: Mark Joseph Pivac, Lesmurdie (AU); Michael Barrington Wood, Subiaco (AU)

(73) Assignee: Goldwing Nominees Pty. Ltd., Welshpool, Western Australia (AU)

( * ) Notice: Subject to any disclaimer, the term of this patent is extended or adjusted under 35 U.S.C. 154(b) by 834 days.

(21) Appl. No.: 12/159,540

(22) PCT Filed: Jan. 2, 2007

(86) PCT No.: PCT/AU2007/000001
§ 371 (c)(1),
(2), (4) Date: Jun. 27, 2008

(87) PCT Pub. No.: WO2007/076581
PCT Pub. Date: Jul. 12, 2007

(65) Prior Publication Data
US 2009/0038258 A1    Feb. 12, 2009

(30) Foreign Application Priority Data
Dec. 30, 2005    (AU) .................................. 2005907347

(51) Int. Cl.
*E04G 21/14*    (2006.01)
(52) U.S. Cl. .................. 52/749.14; 52/749.1; 52/749.11; 52/749.13
(58) Field of Classification Search .................. 52/749.1, 52/749.11, 749.13, 749.14
See application file for complete search history.

(56) References Cited

U.S. PATENT DOCUMENTS 3,930,929 A * 1/1976 Lingl ............................ 156/558
3,950,914 A    4/1976 Lowen
(Continued)

FOREIGN PATENT DOCUMENTS
CH    673 498    3/1990
(Continued)

OTHER PUBLICATIONS http://www.new-technologies.org/ECT/Other/brickrob.htm. "Emerging Construction Technologies." Dec. 1, 2006.
(Continued)

*Primary Examiner* — Brian Glessner
*Assistant Examiner* — Adam Barlow
(74) *Attorney, Agent, or Firm* — Merchant & Gould P.C.

(57) ABSTRACT

An automated brick laying system (10) for constructing a building from a plurality of bricks (16) comprises a robot (12) provided with a brick laying and adhesive applying head (18), a measuring system (13), and a controller (14) that provides control data to the robot (12) to lay the bricks (16) at predetermined locations. The measuring system (13) measures in real time the position of the head (18) and produces position data for the controller (14). The controller (14) produces control data on the basis of a comparison between the position data and a predetermined or pre-programmed position of the head (18) to lay a brick (16) at a predetermined position for the building under construction. The controller (14) can control the robot (12) to construct the building in a course by course manner where the bricks (16) are laid sequentially at their respective predetermined positions and where a complete course of bricks for the entire building is laid prior to laying of the brick for the next course.

25 Claims, 11 Drawing Sheets

U.S. PATENT DOCUMENTS

| | | | |
|---|---|---|---|
| 4,245,451 A | | 1/1981 | Taylor-Smith |
| 4,765,789 A | * | 8/1988 | Lonardi et al. .................. 414/10 |
| 4,827,689 A | | 5/1989 | Lonardi et al. |
| 4,911,595 A | * | 3/1990 | Kirchen et al. .................. 414/10 |
| 5,018,923 A | * | 5/1991 | Melan et al. ..................... 414/10 |
| 5,004,844 A | | 9/1991 | Backhouse |
| 5,284,000 A | * | 2/1994 | Milne et al. ................. 52/749.14 |
| 5,419,669 A | * | 5/1995 | Kremer et al. .................. 414/10 |
| 5,523,663 A | | 6/1996 | Tsuge et al. |
| 5,527,145 A | * | 6/1996 | Duncan ......................... 414/800 |
| 5,557,397 A | | 9/1996 | Hyde et al. |
| 6,370,837 B1 | * | 4/2002 | McMahon et al. ......... 52/749.14 |
| 6,516,272 B2 | | 2/2003 | Lin |
| 6,868,847 B2 | * | 3/2005 | Ainedter et al. .................. 125/12 |
| 7,111,437 B2 | * | 9/2006 | Ainedter ..................... 52/749.14 |
| 2004/0078137 A1 | | 4/2004 | Breakfield et al. |
| 2004/0200947 A1 | | 10/2004 | Lau |
| 2005/0007450 A1 | | 1/2005 | Hill et al. |
| 2005/0060092 A1 | | 3/2005 | Hablani |
| 2005/0086901 A1 | * | 4/2005 | Chisholm .................... 52/749.1 |
| 2005/0196484 A1 | | 9/2005 | Khoshnevis |

FOREIGN PATENT DOCUMENTS

| | | | |
|---|---|---|---|
| CH | 673498 | * | 3/1990 |
| DE | 34 30 915 | | 3/1986 |
| DE | 40 38 260 | | 6/1991 |
| DE | 42 07 384 | | 9/1993 |
| DE | 195 09 809 | | 10/1995 |
| DE | 44 17 928 | | 11/1995 |
| DE | 196 00 006 | | 7/1997 |
| DE | 296 01 535 | | 7/1997 |
| DE | 196 03 234 | | 9/1997 |
| DE | 197 43 717 | | 4/1999 |
| DE | 10 2006 030 130 | | 9/2007 |
| EP | 0 370 682 | | 5/1990 |
| EP | 0 493 020 | | 7/1992 |
| EP | 0 495 525 | | 7/1992 |
| EP | 836664 | | 1/1999 |
| WO | WO 01/76830 | | 10/2001 |
| WO | WO 2004/083540 | | 9/2004 |

OTHER PUBLICATIONS

Riegl Laser Measurement Systems. "Long Range & High Accuracy 3D Terrestrial Laser Scanner System—LMS-Z420i." pp. 1-4.

Trimble ATS. "Advanced Tracking Sensor (ATS) with target recognition capability for stakeless machine control survey applications." pp. 1-4.

* cited by examiner

AUTOMATED BRICK LAYING SYSTEM FOR CONSTRUCTING A BUILDING FROM A PLURALITY OF BRICKS

FIELD OF THE INVENTION

The present invention relates to an automated brick laying system for constructing a building from a plurality of bricks.

BACKGROUND OF THE INVENTION

The general idea or concept of attempting to automate the construction of a building by use of an automated or semi-automated device such as a programmable robot is known and is the subject of numerous prior patents and patent applications. Examples of such patents and patent applications include U.S. Pat. No. 3,950,914 (Lowen), U.S. Pat. No. 4,245,451 (Taylor-Smith) and DE 19600006 (Bachau), U.S. Pat. No. 5,018,923 (Melan), WO 2004/083540 (Steenberg) and EP 836664 (Markel).

The above documents show various aspects of known automated or robotic brick laying methods and apparatus. Some documents concentrate on specific structure of a mechanism for gripping a brick. Other documents relate to building brick structures on a wall by wall basis either in situ or offsite to be transported to a location where a building is to be constructed.

It is to be understood that, if any prior art publication is referred to herein, such reference does not constitute an admission that the publication forms a part of the common general knowledge in the art, in Australia or any other country.

In the claims of this application and in the description of the invention, except where the context requires otherwise due to express language or necessary implication, the words "comprise" or variations such as "comprises" or "comprising" are used in an inclusive sense, i.e. to specify the presence of the stated features but not to preclude the presence or addition of further features in various embodiments of the invention.

Throughout this specification the term "brick" is intended to denote any type of brick or block from which a building can be constructed. Typically this will include masonry, concrete or mud bricks or blocks from which a building or similar structure can be constructed. However the specific material from which the brick or block is made is not critical to the present invention and embodiments of the invention may be applied to bricks or blocks made from other materials such as refractory materials, plastics materials or wood.

Throughout this specification the term "adhesive" is used to denote any compound, mixture, chemical, or settable material that is, or can be, used to adhere two or more bricks as hereinabove defined together. When the bricks are masonry bricks, typically the adhesive will be mortar.

SUMMARY OF THE INVENTION

According to one aspect of the present invention there is provided an automated brick laying system for construction a building from a plurality of bricks comprising:
   a brick laying robot provided with a moveable support structure and a brick laying and adhesive applying head coupled to an end of the moveable support structure the head comprising at least one manipulator operable to lay bricks;
   a measurement system which measures the position in real time of the head and produces corresponding position data; and,
   a controller which receives the position data and produces control data on the basis of a comparison between the position data and a stored predetermined position for the head to lay a brick a predetermined location for the building, the controller controlling the moveable support structure to provide coarse positioning of the head and controlling the or each manipulator to provide fine positioning of the bricks.

The measurement system may comprise an inertial navigation system that provides data relating to the location in space of the head that is used by the measurement system to produce the position data.

The measurement system may further comprise a scanning laser to provide further location data relating to the real time position of a brick held by the head, wherein the measurement system uses the further location data to produce the position data.

According to a second aspect of the present invention there is provided an automated brick laying system for constructing a building from a plurality of bricks comprising:
   a brick laying robot provided with a brick laying and adhesive applying head;
   a measurement system which measures the position in real time of the head and produces corresponding position data; and
   a controller which received the position data and produces control data on the basis of a comparison between the position data and a stored predetermined position for the head to lay a brick a predetermined location for the building, the controller controlling the robot to lay the bricks at their respective predetermined locations in a sequence where a complete course of bricks is laid prior to the laying of a brick for a next course of bricks.

The robot may comprise a movable support structure on which the head is supported and the controller controls motion and position of the support structure and the head on the basis of the control data. The robot may further comprise a ground engaging base to which the support structure is coupled, and wherein the controller controls the position of the base. More particularly, the controller controls the position of the base to maintain the position of the head in a datum plane for a particular course being laid. Depending on the type of base, the control exerted may be manifested by the deployment of one or more jacks on the base to counteract a bending or twisting moment applied by the support structure to the base.

In one embodiment the head comprises at least one manipulator arranged to grip and lay a brick at its predetermined location and apply adhesive on the building at that predetermined location. In such an embodiment the or each manipulator applies adhesive on horizontal and vertical surfaces at the predetermined location.

However in an alternate embodiment of the automated brick laying system the brick laying and adhesive applying head may comprise first and second manipulators, each manipulator arranged to (a) grip and lay a brick at a predetermined position; and (b) apply adhesive for the brick to be laid.

The first manipulator may lay adhesive for a brick to be laid by the second manipulator, and the second manipulator may likewise apply adhesive for a brick to be laid by the first manipulator.

In one form of the automated brick laying system, the first and second manipulators apply adhesive at locations which, when a brick is laid, are between vertical faces of that laid brick and a previously laid brick on the same course and a horizontal face of that laid brick and a structure on which the laid brick is supported. When the manipulators apply adhesive between the vertical faces, one of the manipulators may apply a force to the brick being laid in a direction to compress the adhesive between vertical faces of the brick being laid and a previously laid brick. In this embodiment, the other manipulator may hold the previously laid brick while the compressive force is being applied.

The automated brick laying system may further comprise a conveyor system that transports individual bricks from a supply of bricks to the head. An automated brick loader may also be provided that automatically loads bricks from the supply onto the conveyor system. In one embodiment, the conveyor system comprises one or more endless loop conveyors.

The automated brick laying system may further comprise a brick cutting device to cut a brick to a shape required for laying at a predetermined location in the building. The cutting device can take the form of a saw or a guillotine. The cutting device may be located upstream of the conveyor system.

However a further embodiment is envisaged that instead of the conveyor system the head may further comprises a brick carrying device which hold a supply of bricks to be laid. The supply could for example be a pallet of bricks.

In one embodiment of the automated brick laying system, the base is located outside of a peripheral wall of the building to be constructed. The base may further comprise a plurality of jacks and/or a movable counter weight that can be controlled by the controller. The movable support structure can comprise one of the group consisting of a scara arm, a telescopic boom, a gantry or some other form of crane like structure.

According to a further aspect of the present invention there is provided an automated brick laying system for constructing a building from a plurality of bricks comprising:
first and second manipulators wherein at least the first manipulator is arranged to grip and lay a brick and at least the second manipulator is arranged to lay adhesive for a brick gripped by the first manipulator.

In this aspect of the invention each of the first and second manipulators may be arranged to (a) grip and lay a brick at a predetermined position; and (b) apply adhesive for the brick to be laid. Additionally the system may comprise a controller which controls the first and second manipulators to lay the bricks at respective predetermined locations in a sequence where a complete course of bricks is laid prior to the laying of a brick for a next course of bricks.

According to a further aspect of the invention there is provided an automated brick laying system for constructing a building from a plurality of bricks comprising:
a brick laying robot provided with a moveable support structure adapted to reach over an entire area of the building being constructed and a brick laying and adhesive applying head coupled to an end of the moveable support structure;
a measurement system which measures the position in real time of the head and produces corresponding position data; and,
a controller which receives the position data and produces control data on the basis of a comparison between the position data and a stored predetermined position for the head to lay a brick at a predetermined location for the building, the controller controlling the moveable support structure to provide coarse positioning of the head and controlling the or each manipulator to provide fine positioning of the bricks.

In this aspect of the invention the controller may control the moveable support structure to move with a slow dynamic response and control the or each manipulator to move with a fast dynamic response.

According to a further aspect of the invention there is provided an automated method of constructing a building from a plurality of bricks comprising:
providing a brick laying robot having a brick laying and adhesive applying head;
measuring the position in real time of the head and producing corresponding position data;
producing control data on the basis of a comparison between the position data and a stored predetermined position for the head to lay a brick at a predetermined location for the building; and,
controlling the robot to lay the bricks at their respective predetermined locations in a sequence where a complete course of bricks is laid prior to the laying of a brick for a next course of bricks.

BRIEF DESCRIPTION OF THE DRAWINGS

Embodiments of the present invention will now be described by way of example only with reference to the accompanying drawings in which.

DETAILED DESCRIPTION OF THE PREFERRED EMBODIMENTS

Figure 1:
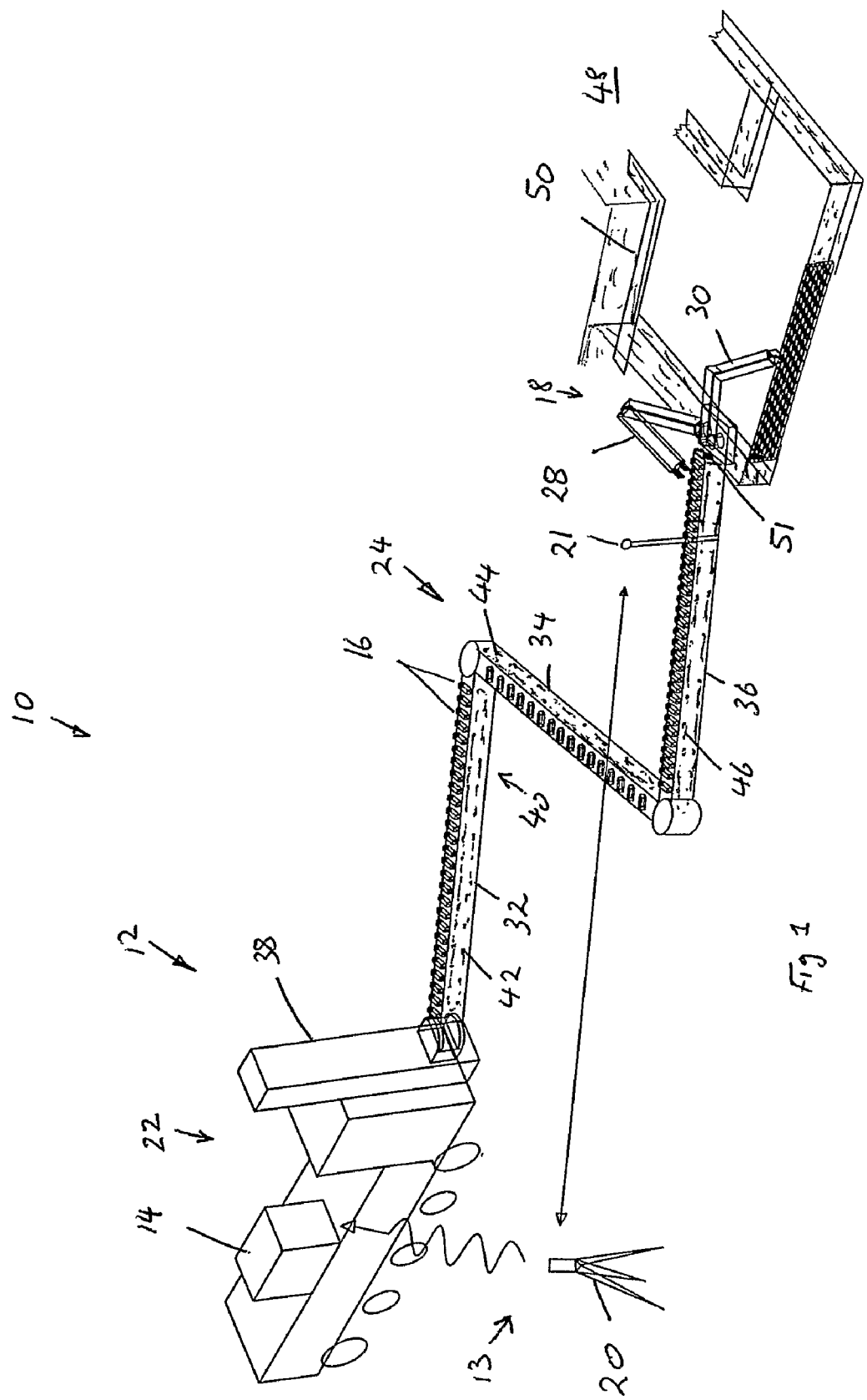
FIG. 1 is a schematic representation of a brick laying robot for a first embodiment of an automated brick laying system in accordance with the present invention.
Figure 7:
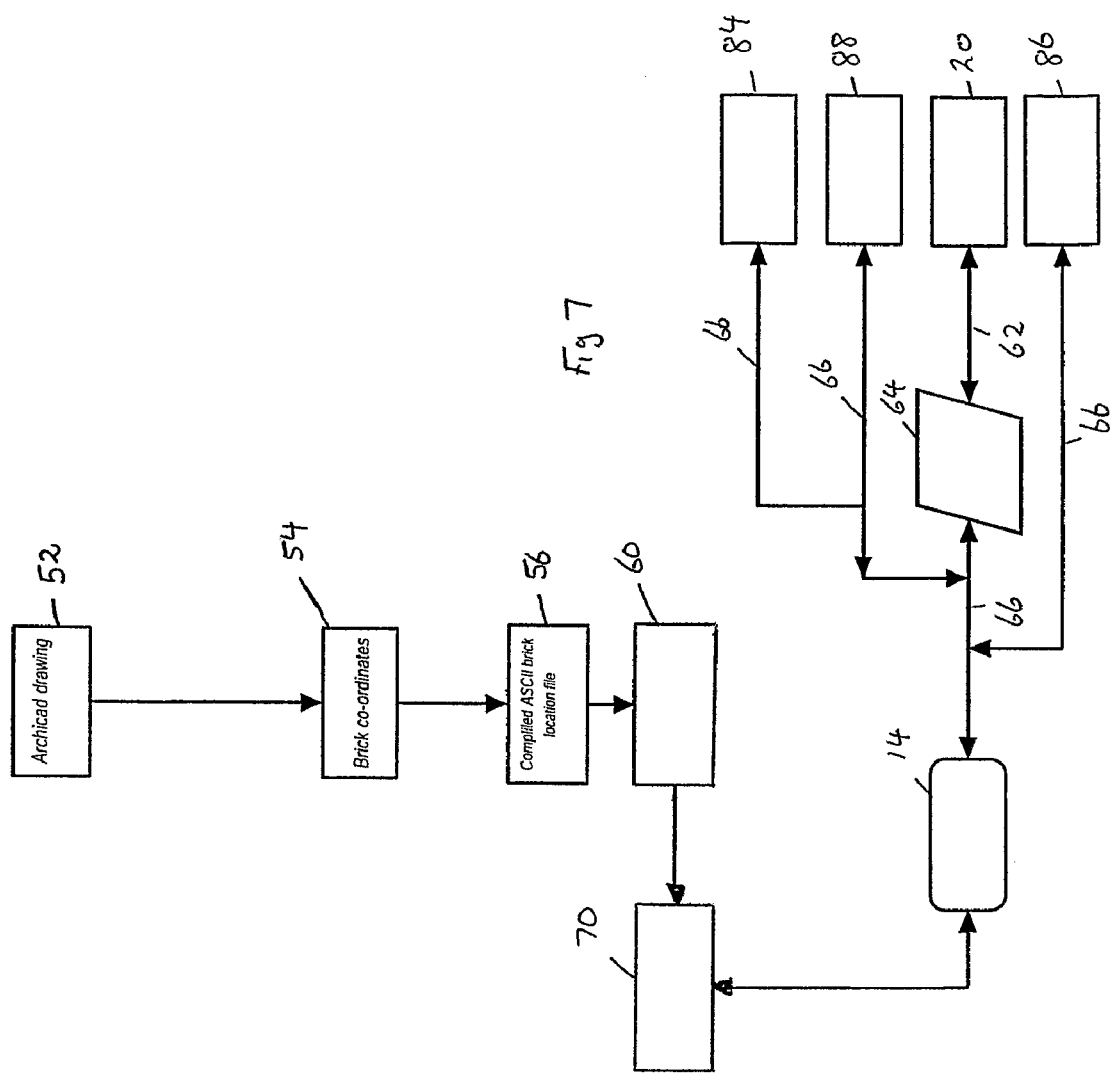
FIG. 7 is a general overview for the automated brick laying system.

FIGS. 1 and 7 depict the substantive components for an embodiment of an automated brick laying (ABL) system 10 in accordance with the present invention. In particular FIG. 1 depicts a brick laying robot 12, measuring system 13 and controller 14 for one embodiment of the ABL system 10, while FIG. 7 provides a general overview of the operations or functions performed by the ABL system 10. In a broad sense, the ABL system 10 for constructing a building from a plurality of bricks 16 comprises the brick laying robot 12 provided with a brick laying and adhesive applying head 18, the measuring system 13 and the controller 14 that provides control data to the robot 12 to lay the bricks 16 at predetermined positions. The measuring system 13 measures in real time the position of the head 18 and produces position data for the controller 14. The controller 14 produces control data on the basis of a comparison between the position data and a predetermined or per-programmed position of the head 18 to lay a brick 16 at a predetermined position for the building under construction. The robot 12, under the control of the controller 14 applying the control data, constructs the building. A database 70 (shown in FIG. 7) holding the predetermined positions for the brick and co-ordinate data for the robot 12 may be formed in a manner so that the ABL system 10 constructs the building course by course where the bricks 16 are laid sequentially at their respective predetermined positions where a complete course of bricks for the entire building is laid prior to laying of a brick for the next course.

The measuring system 13 may incorporate a (or indeed a number of) automated total station (ATS) 20 and an associated target 21. The measurement system 13 provides real time position data relating to the position in space of the head 18 and sends that position data to the controller 14, typically by a radio communication link, although of course any type of communication link may be used.

The robot 12 comprises a combination of off-the-shelf components which are known in the construction and/or robotic industries. With reference to FIG. 1, the robot 12 comprises a base 22 in the form of a tractor or wheel based vehicle, a movable support structure in the form of a scara arm 24 which is coupled at one end to the base 22, and at an opposite end to the brick laying and adhesive applying head 18. The head 18 comprises first and second manipulators 28 and 30. The manipulators can take the form of numerous commercially available or specially constructed robotic arms provided with a gripper. One example of such a gripper is FESTO HGPT-63-A-G1 parallel gripper. An outlet of an adhesive delivery system, such as, but not limited to a PUTZMEISTER MP25 mixit mixer pump is attached to each of the manipulators 28 and 30 for the delivery of mortar which acts an adhesive when the building being constructed is made from masonry bricks. The scara arm 24 comprises a first length 32 which is coupled at one end to the base 22, a second length 34 that is coupled at one end to the opposite end of length 32 and a third length 36 that extends from an opposite arm of the second length 34 to the head 18. The first length 32 is coupled to an elevator 38 of the base 22. The elevator 38 allows the entire arm 24 to be translated in a vertical plane.

As will be understood by those skilled in the art, the length 32 is coupled about a vertical pivot axis to the elevator 38, and the second length 34 is coupled at each of its opposite ends about respective vertical pivot axis to the lengths 32 and 36. Thus the entire scara arm 24 can fold and unfold in a horizontal plane by relative pivoting of the lengths 32, 34 and 36 about their respective vertical pivot axis. In addition, by virtue of the coupling of the arm 32 to the elevator 38, the entire scara arm 24 can be moved in a vertical plane. Each of the manipulators 28 and 30 may be provided with at least five or six degrees of freedom of movement.

A conveyor system 40 is provided along the scara arm 24 for transporting bricks 16 from a supply or stack of bricks (typically in the form of a plurality of pallets of bricks) to the head 26. The conveyor system 40 comprises a plurality of individual endless loop conveyors 42, 44 and 46 for each of the lengths 32, 34 and 36 of the scara arm. The conveyor system 40 delivers a brick to a known position at the head 18 so that every time a brick is delivered to the head 18 its precise position is known relative to the head 18. Thus each time a brick is picked up by a manipulator 28 and 30 it is picked up in a known position relative to that manipulator 28, 30.

As is apparent from FIG. 1, the ABL system 10 operates or is deployed on the actual building site. Here, the site 48 is provided with a pre-laid footing 50 on which the bricks 16 laid by the ABL system 10 are supported. It will also be noted in this embodiment, the base 22 is on the outside of a peripheral wall of the building to be constructed. However in alternate embodiments, particularly where a regular shaped large building such as a rectangular storage shed is being constructed, the base 22 may be located inside the peripheral wall. It is recognised however that in the event of the base 22 being inside the peripheral wall, access must be provided in order to enable the base 22 to be removed after construction of the building.

The base 22 includes various motors, pumps and compressors for example a diesel motor, hydraulic motor, electric motors, and air compressors to provide appropriate power to the remaining components of the robot 12. The base 22 may also include an industrial controller or provide plugs and/or jacks to enable connection to an industrial controller to provide control signals to affect the required motions and actions of the robot 12.

The measurement system 13 may also comprise an inertial navigation system 51 located near or adjacent to the target 21 on the head 18 or support structure/arm 24. The inertial navigation system 51 may be any of a number of commercially available units that include accelerometers and gyros and a microprocessor that integrates the accelerations to provide spatial position data to the controller 14. The inertial navigation system data is used to provide a high bandwidth (ie high update rate) position data stream between readings from the low bandwidth (ie low update rate) ATS 20. The high data rate is required by the controller 14 to enable real time correction of structural dynamic effects and deflection of the arm 24. Typically inertial navigation systems suffer from position output drift error (ie error that increases with time). However with the frequent updating of actual position from the ATS 20 (typically 5 to 80 Hz) the effects of this problem can be reduced or eliminated.

Indeed it is envisaged that an alternate embodiment of the measurement system 13 may be possible where only the an inertial navigation system 51 is used in conjunction with measurement of the relative position of the arm 24 via position encoders and static deflection estimation based on look up tables or formula based on the position of boom components for the purposes of determining the dynamic component of deflection of the arm 24.

FIG. 7 provides a general overview of the operation of the system 10. At an initial step 52, architectural CAD drawings are provided as initial input data to the system 10. The drawings are converted at step 54 to a series of brick co-ordinates identifying the location of each brick in space. The brick co-ordinates are then converted at step 56 to an ASCII brick location file.

Prior to the operation of the robot 12 to lay bricks, the controller 14 performs a routine 60 to adjust, if necessary, the location file 56 to take account of the actual conditions on the building site 48 and in particular the location and geometry of the footing 50 prior to the commencement of construction. In order to perform the routine 60, the measuring system 13, and in particular in this embodiment, the ATS 20 is set up to conduct a survey of the site 48. This is performed using normal surveying techniques. A radio link 62 transfers survey data from the ATS 20 via an ATS interface 64 and a communication bus 66 to the controller 14 which runs the routine 60. Upon running the routine 60 the controller modifies if necessary a database 70 containing co-ordinate data the bricks to be laid and for the robot to lay the bricks 16. The co-ordinate data for the robot may comprise data relating to the axis position of joints of the arm 24 and manipulators 28 and 30, to lay a brick at a predetermined location in the building.

A human-machine interface (not shown) may be provided to allow operator intervention such as selecting between two or more building design changes required to take account of variations between a designed footing/building location and the actual footing design and/or building location.

When onsite, the ATS 20 makes real time measurements of the position in space of the head 18 by viewing the target 21 (see FIG. 1) at the end of the scara arm 24. Since the bricks delivered by the conveyor system 40 are presented at a known location for gripping by the manipulators 28 and 30, knowing the location of the head 18 also means that the position of a brick to be gripped by the manipulators 28 and 30 is known. Further, given that the configuration of each of the grippers 28 and 30 is known and their movements are controlled, the location of a brick held by the grippers 28 and 30 is always known irrespective of the movement of the manipulators 28 and 30. Of course, as is common, the manipulators 28 and 30 are provided with position transducers such as rotary and linear encoders so that their position in space is known and can be fed back to the controller 14.

The controller 14 runs a process 84 for controlling the laying head 18, and in particular the manipulators 28 and 30; a process 86 for controlling the position and motion of the scara arm 24; and a process 88 for controlling the base 22. The signals for the control of the head 18, scara arm 24 and base 22 are provided by the communication bus 66.

Figure 8:
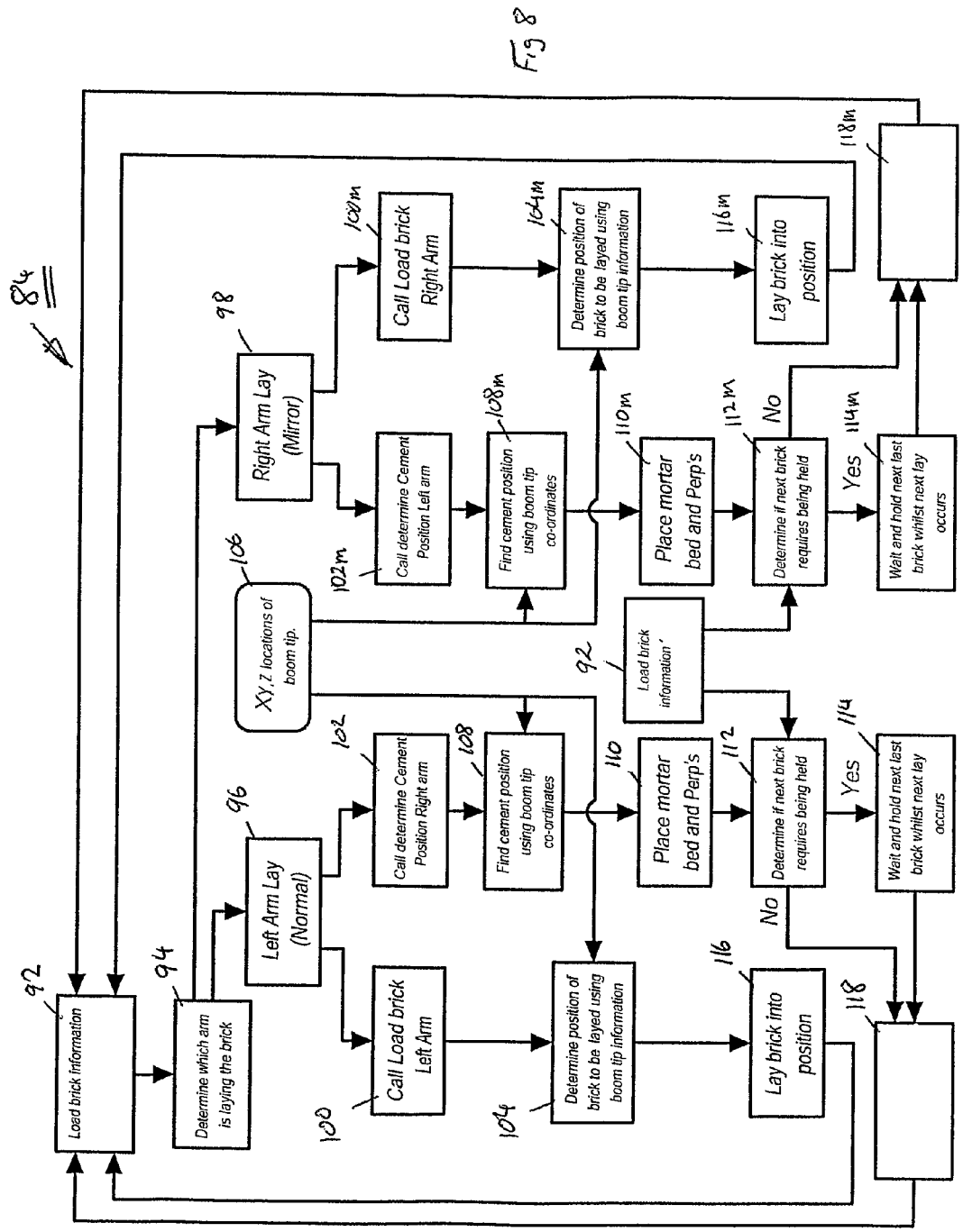
FIG. 8 is a process flow diagram depicting one method of controlling a brick laying head of the brick laying robot.

FIG. 8 depicts the main process flow steps for the process 84 shown in FIG. 7. The first step 92 in the process 84 is to load brick information from the database 70. Next, at step 84, a decision is made as to which of the manipulators 28 and 30 is to lay the next brick. From here, the routine 84 splits into two mirror image subroutines, comprising subroutine 96 for the arm 28 and subroutine 98 for the arm 30.

In the following description only the subroutine for arm 96 will be described in detail. At step 100 the arm 28 is provided with signals instructing it to pick up the next brick while at step 102 the arm 30 is in effect notified that it will be laying adhesive (e.g. mortar) for the next brick to be laid. Following step 100, the controller 14 at step 104 determines the position at which the brick, which was picked up by the arm 28, is to be laid. In determining this position, the step 104 is provided with data on the real time position of the tip of the arm 24. This data is derived via step 106, which in turn is derived from the ATS 20. The position data provided by step 106 is continuously updated taking into account the movement of the robot 12 during the brick laying process. When determining the position of the brick to be laid in order to control the motion of the robot 12 and in particular the manipulators 28 and 30, the controller 14, in constructing the control data, takes into account the information derived from the database 70, the real time position of the head 18, and a predicted position of the brick held by a manipulator 28, 30 in the period between real time position measurements taken by the measurement system 13. More particularly the controller 14 compares the measured position of the head 18 and compares that with an expected position of the head 18 stored in database 70 for a brick to be laid at a predetermined or pre-programmed position. If these positions match or are within an acceptable range then the control data used or produced by the controller 14 corresponds with the robot co-ordinate data in database 70. If these positions do not match and are not within an acceptable range, (for example due to wind loading or deflection of the arm 24) the controller modifies the robot co-ordinate to produce the control data to ensure that brick is laid at its predetermined position in the building.

At step 106, following the step 102, the controller also determines the position of the manipulator 30 for the purposes of applying the mortar. The process here is in essence identical to the process at step 104 and utilises as an input the position data derived from step 106.

Following step 108, the arm 30 is controlled at step 110 to place mortar at a location to receive the brick to be laid by the arm 28. Typically, the mortar will be placed on a vertical face of a previously laid brick on the same course, and half of the horizontal face of two adjacent bricks on an underlying course. (Naturally, in the event of the first course being laid, then the application of the horizontal bed of mortar will be simply on the footing rather than on any bricks laid course of bricks).

After the arm 30 has laid its mortar, a determination is made at step 112 as to whether a previously laid brick requires to be held. This will occur for example where the previously laid brick is at a corner or at an end of a wall. When mortar is applied between vertical faces of adjacent bricks, the manipulator laying the next brick to applies a compressive force on the mortar between the vertical faces. This force may move or dislodge a previously laid brick if that brick is not held. It may be a requirement that the first few bricks following a corner or end of a wall require to be held while a brick is being laid.

However it is also envisaged that in buildings where mortar or adhesive is not applied to vertical faces, for example where bricks with interlocking vertical faces are used, there may be no need to hold a previously laid brick. In the event that at step 112 it is determined that a previously laid brick requires to be held then the controller 14 at step 114 controls the manipulator 30 to hold the previously laid brick. Meanwhile, at step 116, the manipulator 28 is controlled to lay the next brick. The laying of the brick is sensed and the brick location filed at step 92 is updated to provide the position information for the next brick to be laid.

Irrespective of whether the manipulator 30 during the laying process held, or was not required to hold, the previously laid brick, at step 118 the manipulator 30 is driven to a position to pick up the next brick to be laid. Thereafter, the routine repeats itself but in a mirror image following the subroutine 98 and mirrored steps 100*m*-118*m*. Thus the arm that previously laid a brick now becomes the arm that lays the mortar while the arm that previously laid the mortar becomes the arm that lays the next bricks.

Figure 9:
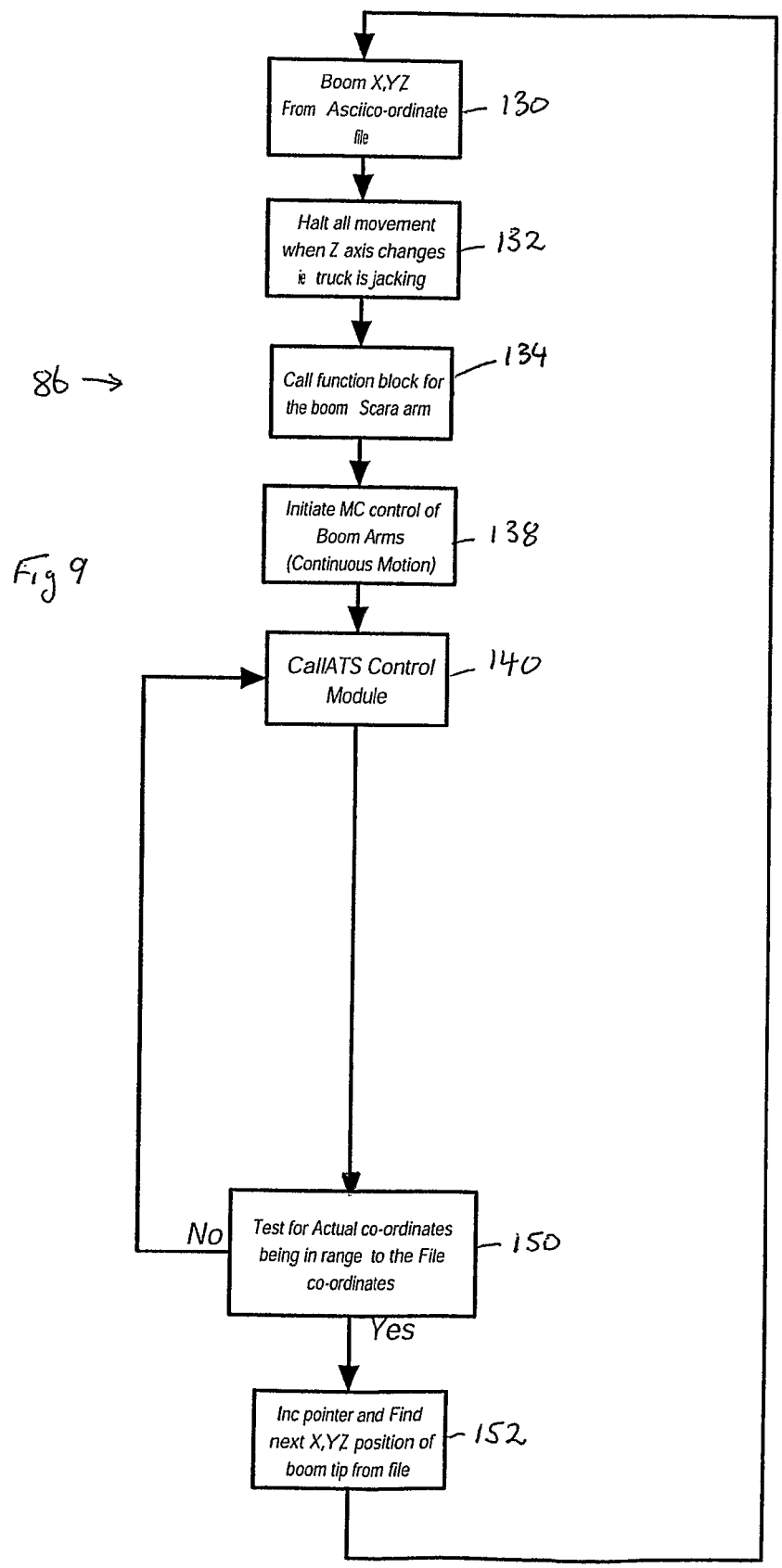
FIG. 9 is a process flow diagram depicting an embodiment of one method for controlling a boom of the brick laying robot.

FIG. 9 depicts the main processes in the support structure positioning routine 86 referred to in FIG. 7. The routine commences at step 130 where the database 70 is accessed to obtain the location required for the head 18 to lay the next brick. At step 132 the controller halts movement of the arm 24 and head 18 if the location derived at step 130 indicates that a change in the height of the arm 24 and head 18 is required to lay a new course of bricks, in which case a further routine adjusts their height by, for example in FIG. 1, operating the elevator 38 to lift the entire structure of the arm 24 and head 18 in the vertical plane. However in alternate embodiments, as will be described in greater detail hereinafter, this may be achieved by the operation of jacks to lift the base 22.

At step 134 the routine 86 accesses a function block used for controlling motion of the arm 24 this function block calculates a preferred motion of the arm 24 to move between two points. In this regard, it should be recognised that given the multiple pivot axis for the lengths 32, 34 and 36 the lengths may be individually moved in a number of different ways in order for the tip of the arm, ie the head 18, to be moved to a particular position. Step 134 determines the most efficient motions of the individual lengths 32,34,36 to achieve the desired position of the head 18.

At step 138, the controller 14 initiates movement of the arm 24. Next at step 140 the position data from the measurement system 13 is called in order to determine the position of the end of the arm 24 (which corresponds with the position of the head 18). Subsequently at step 150 a test is made to determine whether the tip of the arm 24 is at a location within a desired range or region for the laying of the next brick. For example, it may be desired to locate the tip of the arm 24, i.e. the head 18 within an imaginary sphere having a radius of 100 mm from the required laying location. Thus in effect, the routine 86 provides a "coarse control" for the position of the laying of the next brick. "Fine control" of the robot 12 for the positioning of the brick to be laid is achieved by the previously described routine 84 depicted in FIGS. 7 and 8. More particularly the support structure, which in FIG. 1 is embodied by the arm 24, is controlled to cover relatively large distances but with relatively low positional accuracy and slow dynamic response. In contrast the head 18, and moreover the manipulators 28 and 30, are controlled to cover smaller distances but with high positional accuracy and fast dynamic response, and in a manner that corrects for any deflection or positional error of the support structure.

If at step 150 it is determined that the boom is within a predetermined range of locations then at step 152 a pointer is incremented in the database 74 to point to the next position and space required for the tip of the arm 24/head 18 in order to lay the next brick. The routine then recommences at step 130. The routine 86 may indeed hold the arm 24 at a particular location while several bricks are being laid if the tip of the arm 24 is determined at step 150 to be within a predetermined range for the laying of the next brick.

Figure 10:
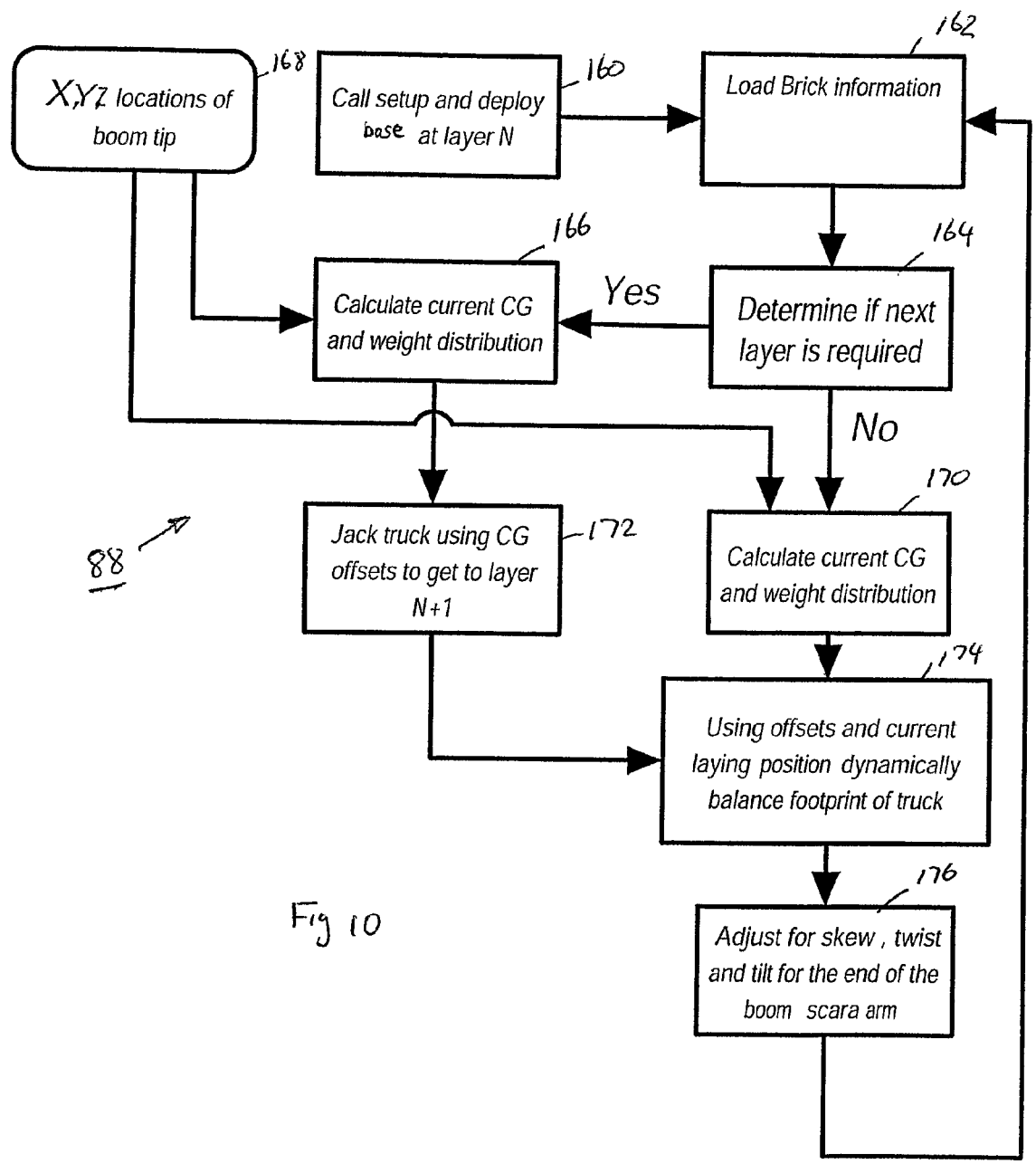
FIG. 10 is a process flow diagram showing a method of controlling a base of the brick laying robot; and, FIG. 11 is a schematic representation of a brick laying and adhesive applying head incorporated in a sixth embodiment of the brick laying system.

The base control process 88 depicted in FIG. 7 is shown in greater detail in FIG. 10. The process 88 commences at step 160 where a set up routine is called for the base 22. This routine involves placing the base 22 at a particular location on the site 48 and measuring that location together with the vertical position of the arm 24 and head 18. Next at step 162, information regarding the location of the next brick to be laid is loaded from the database 72. At step 164 a determination is made as to whether the brick to be laid is, on the same course as the previous brick or, the first brick in a next course. If the brick is the first brick in the next course then at step 166, the current centre of gravity and weight distribution of the robot 12 is calculated. In order to perform this calculation, the location of the tip of the arm 24 is derived at step 168 using the ATS 20 and provided as an input to the step 166. The information derived from step 168 is also provided as an input to step 170 which is the step that the process 88 progresses to in the event that at step 164 it is determined that the brick to be laid is on the same course as the previously laid brick.

Following step 166, a routine 172 is deployed to vertically lift the arm 24 in order to lay the next course of bricks. Depending on the type of base 22, this can be achieved by either operating the elevator 38 to increment the vertical position of the arm 24, or if the base 22 is provided with ground engaging jacks, this process may involve operating the jacks to lift the base and thus the arm 24. During this process account is taken of the centre of gravity for the entire robot 12 which of course will change with the lifting of the arm 24 and/or base 22.

At step 174, using information from steps 170 and 172 as inputs, the footprint of the base 22 is dynamically balanced. This may involve the movement of counter weights and/or the operation of jacks or stabilizers. Finally, at step 176, further adjustment is made to the base 22 to take account of skew, twist and tilt at the end of the arm 24.

Figure 2:
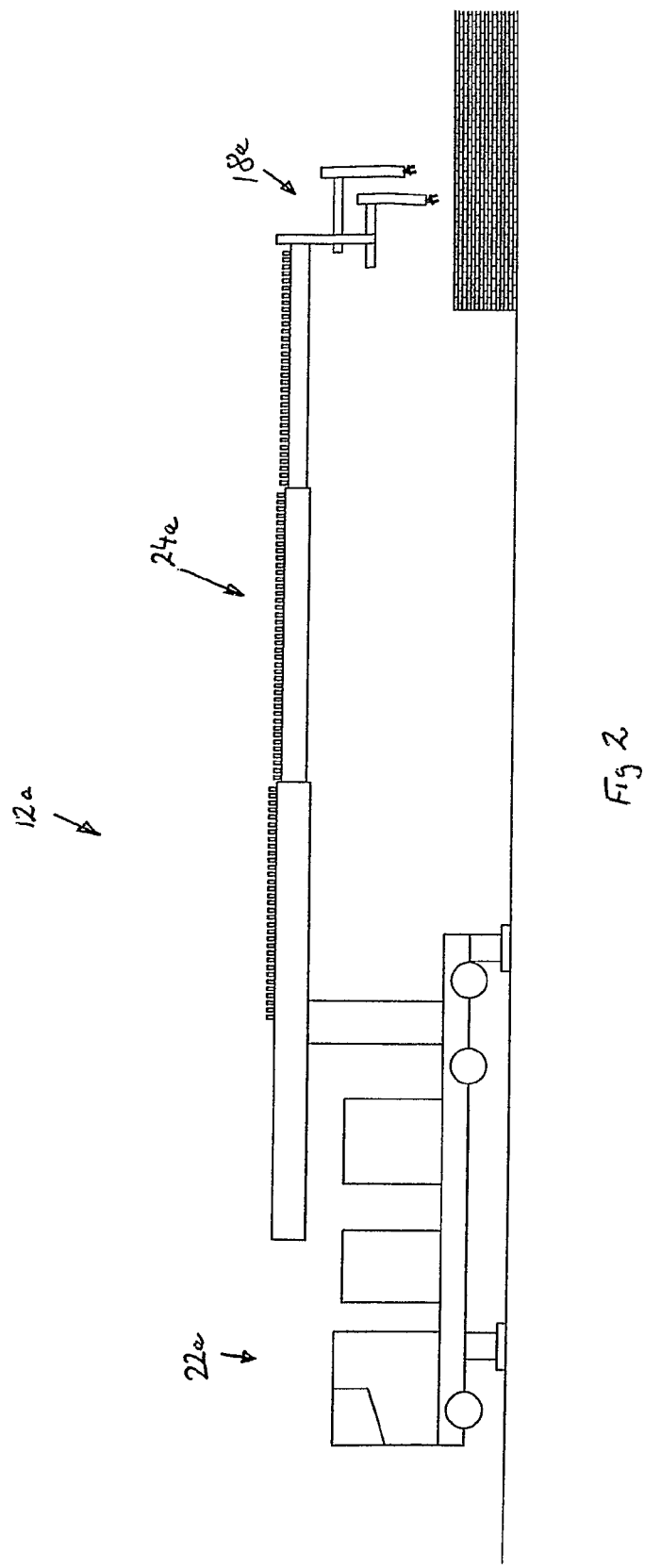
FIG. 2 is a schematic representation of a brick laying robot for a second embodiment of the automated brick laying system.

The positioning system 14 depicted in FIGS. 7-10 can be used within a variety of different types of robots 12. FIG. 2 depicts an alternate form of robot 12a which performs the same functions as a robot 12 shown in FIG. 1 but with the scara arm 24 replaced by a telescopic boom 24a. A head 18a is coupled to the end of the boom 24a distant the vehicle 22a, and is provided with manipulators 28 and 30 similar to that depicted in FIG. 1.

Figure 3:
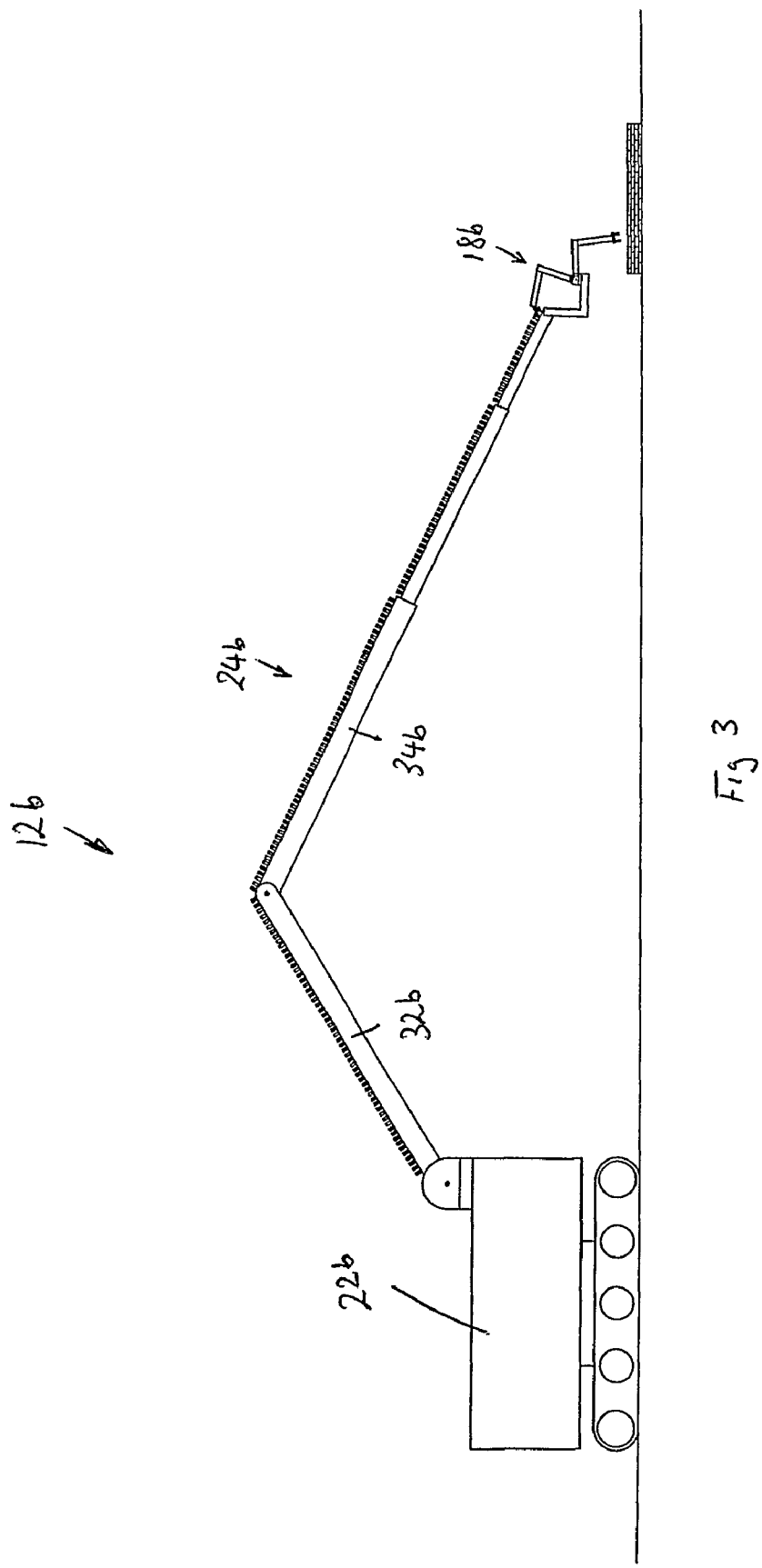
FIG. 3 is a schematic representation of a brick laying robot for a third embodiment of the automated brick laying system.

FIG. 3 depicts in a further variation of the robot 12b which comprises a track based vehicle 22b provided with a composite boom 24b comprising a first articulated length 32b and a second articulated length 34b, where the length 34b comprises a telescopic arm. A head 18b similar to the head 18 shown in FIG. 1 is provided at the end of the length 24b.

Figure 4:
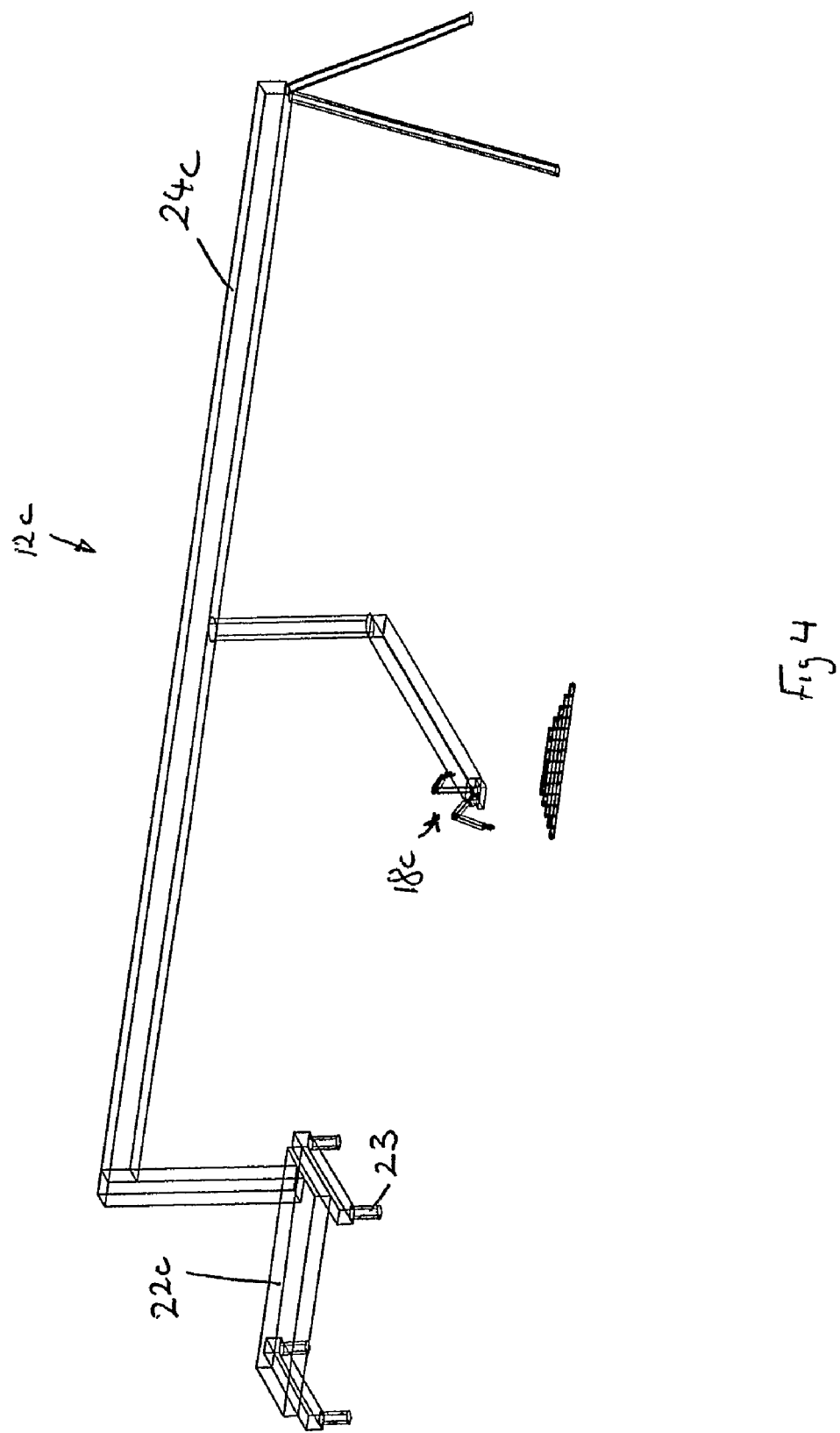
FIG. 4 is a schematic representation of a brick laying robot for a fourth embodiment of the automated brick laying system.

FIG. 4 depicts a further variation of the robot 12c in which the base 22c is in form of a platform supported on a plurality of jacks 23 and a gantry 24c in place of the scara arm, which supports a head 18c similar in construction and operation to the head 18 of FIG. 1.

Figure 5:
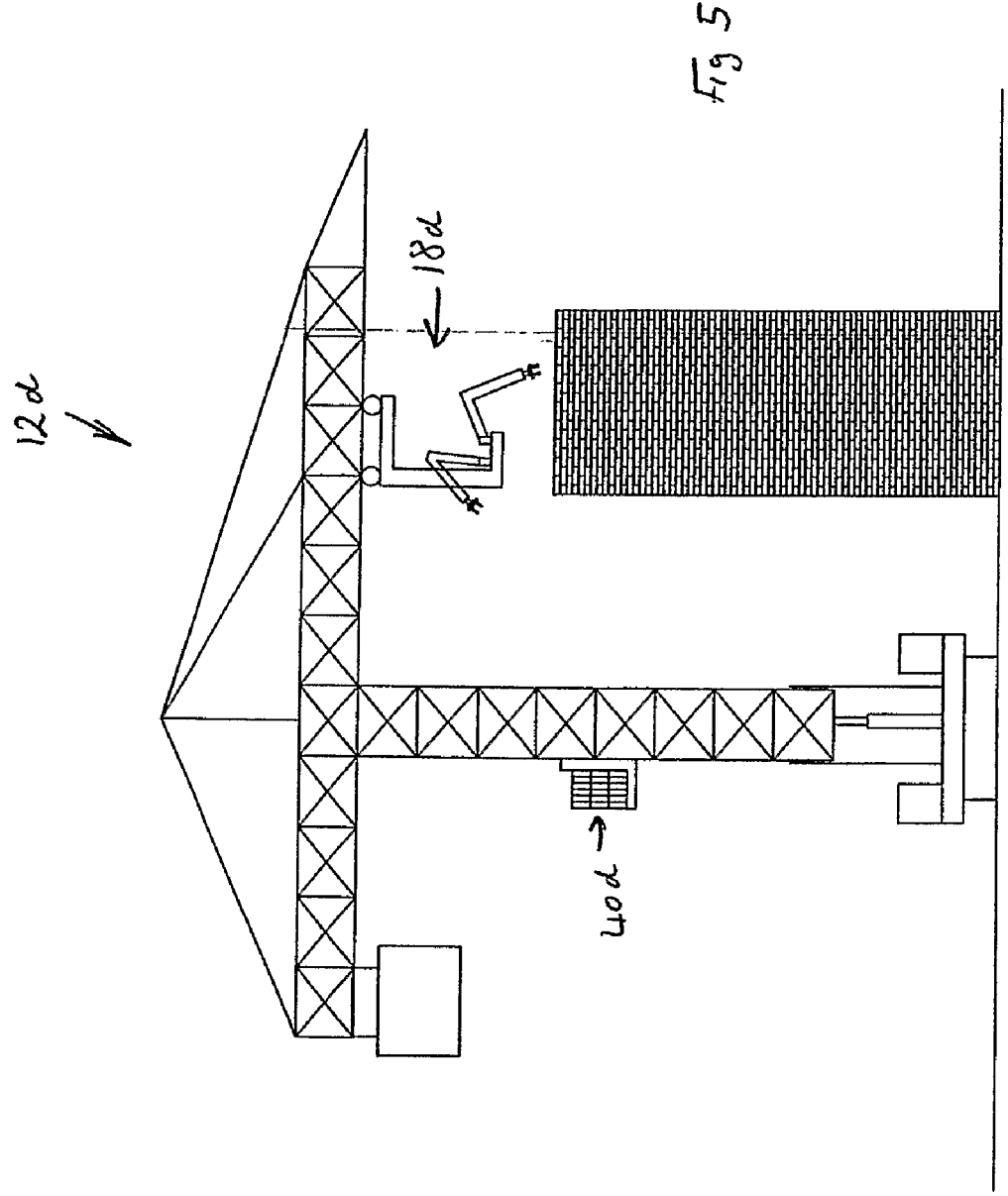
FIG. 5 is a schematic representation of a brick laying robot for a fifth embodiment of the automated brick laying system.

FIG. 5 depicts in a further variation of the robot 12d where the support structure is in the form of a tower crane to which the head 18d of similar construction to the head 18 is coupled. Also in this embodiment the conveyor system 40 comprises a brick elevator 40d which carries a supply of bricks to the head 18d.

Figure 6:
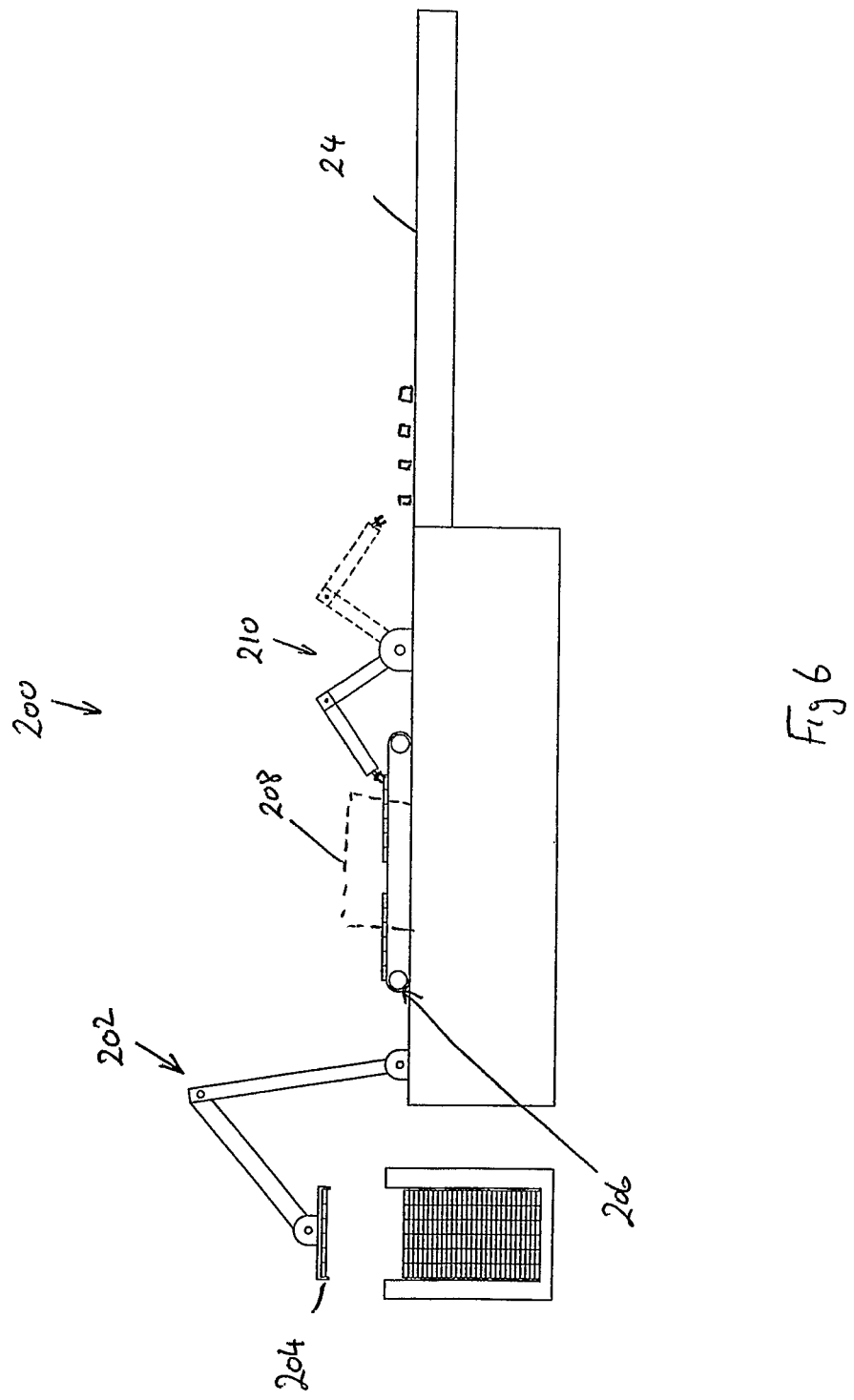
FIG. 6 is a schematic representation of a brick loading system incorporated in an embodiment of the automated brick laying system.

FIG. 6 is a schematic representation of a brick loading system incorporated in the automated brick laying system 10. The brick loading system 200 comprises a robotic arm 202 having a gripping mechanism 204 at one end that can grip a row of bricks. The robotic arm 202 places the bricks on a conveyer 206 which passes through a brick cutting device 208. The brick cutting device 208 is under the control of the positioning system 14 and operates to cut a brick if required. Information pertaining to whether or not a brick is to be cut is obtained from the brick location database 72. Bricks are cut in accordance with the laying sequence of bricks. The cutting of the bricks may be achieved by use of a guillotine or a saw. The bricks exiting the cutter 24 are transferred by a further robotic arm 210 onto the conveying system 40. Thus, the cutting is performed upstream of conveying system 40.

In order to enhance the safety, a perimeter light curtain may be set up to prevent unauthorized access to the building site 48. If the light curtain is tripped motion of robot 12 is halted. It is further envisaged that the system 10 may require only a single operator. The operator may be provided with a RF transponder or identification badge that is recognized by the system 10 and can be sensed by sensors mounted on the head 18. If the operator wearing the badge is sensed to be within a dangerous distance of the sensor, the robot is halted.

It would be appreciated from the above description that in embodiments of the present invention, the system 10 provides accurate laying of bricks by measuring and taking account of deflection in the arm/support structure 24 due to gravity, wind and dynamic response (i.e. the motion of the boom itself). Door and window frames, lintels and other building elements that are required in the building being construction, are simply dropped or inserted into place by the operator prior to the laying of the course of bricks immediately above such element. To this end the database 70 contains information on the position of door, windows and other openings and halts the laying of bricks automatically to allow such elements to be dropped into spaces which were left in the walls being constructed. The ABL system 10 may also provide an audio and/or visual message alerting the operator of the need to insert the required building elements. To this end in one possible embodiment the manipulators 28 and 30 can be fitted with optical proximity sensors to ascertain the exact location of gripped brick and use such sensors to check that the lintel, doorframe or other component has been placed. The controller 14 can be provided with a "check item has been placed" subroutine that essentially moves the gripper (without a brick) over the item so that the proximity sensor can detect its presence, if there is no item, the operator is alerted, if the item is there the program continues.

Figure 11:
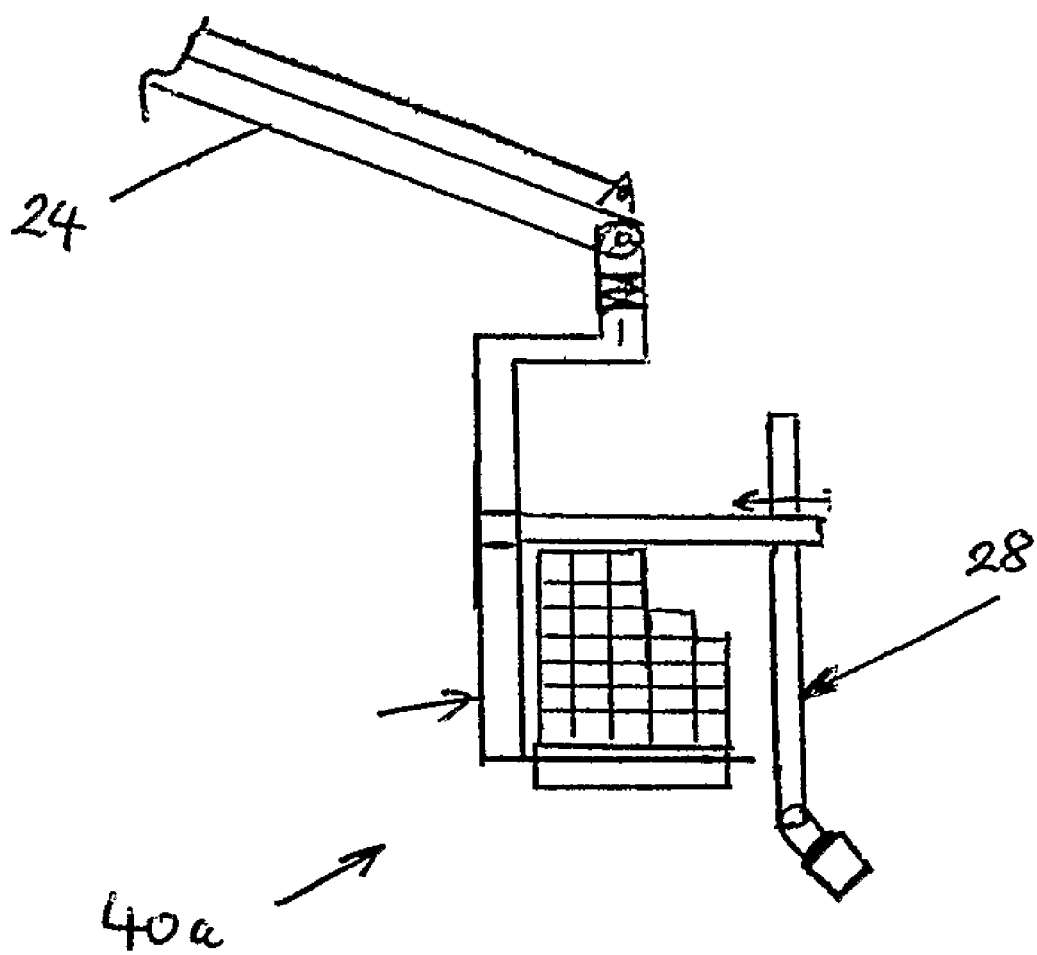

In the embodiments shown in FIGS. 1-6 a conveyor system 40 is depicted for transferring bricks 16 from a supply to the head 18. However as shown in FIG. 11, in an alternate arrangement the conveyor system 40 can be replaced by a brick carrying device 40a incorporated in the head 18. The device 40a holds and a supply of bricks which the manipulators can grip. This embodiment also shows a further variation where the head comprises a single manipulator 28 rather than two manipulators. Nevertheless, it will be appreciated that two or more manipulators can be used with the brick carrier device 40a.

Now that embodiments of the invention have been described in detail it will be apparent to those skilled in the ordinary arts that numerous modifications and variations may be made without departing from the basic inventive concepts. For example in the described embodiments, the head 18 is depicted as comprising two robotic arms or manipulators 28 and 30. However the head 18 may be provided with only a single manipulator or alternately may be provided with more than two manipulators. Further, the described embodiments employ an automatic total station 20 for position measuring. However other types of position measuring systems may be used in place of, or in combination with, the ATS 20 such as differential GPS combined with a scanning laser to provide a vertical position measure; and/or the use of strain gauges to provide measurement data on the deflection of the boom. All such modifications and variations together with others that would be obvious to a person skilled in the art are deemed to be within the scope of the present invention in the nature of which is to be determined from the above description and the amended claims.

The invention claimed is:

1. An automated brick laying system for constructing a building from a plurality of bricks comprising:
   a brick laying robot provided with a base coupled at one end to a moveable support structure and a brick laying and adhesive applying head coupled to an opposite end of the moveable support structure, the head comprising at least one manipulator operable to lay bricks;
   a measurement system which measures the position in real time of the head and produces corresponding position data, wherein the measurement system includes a non-contact optical line-of-sight position measuring system remotely located away from said base to view a target located on the opposite end of the moveable support structure; and
   a controller which receives the position data and produces control data on the basis of a comparison between the position data and a stored predetermined position for the head to lay a brick at a predetermined location for the building, the controller controlling the moveable support structure to provide coarse positioning of the head and controlling the at least one manipulator to provide fine positioning of the bricks, wherein the fine positioning provides finer positioning than the coarse positioning, and wherein the controller controls the moveable support structure to move with a slow dynamic response, and controls the at least one manipulator to move with a fast dynamic response to compensate for structural dynamic effects and deflection of said moveable support structure, wherein the fast dynamic response is faster than the slow dynamic response.

2. The automated brick laying system according to claim 1 wherein the automated total station and/or the scanning laser measures the position in real time of the head with a low update rate of data of from 5 to 80 Hz, and the measurement system also measures the position in real time of the head at a high data update rate to enable real time correction of structural dynamic effects and deflection.

3. The automated brick laying system according to claim 2 wherein the measurement system comprises an inertial navigation system to measure the position in real time of the head at a high data update rate, that provides data relating to the location in space of the head to the controller.

4. The automated brick laying system according to claim 1 wherein the measurement system comprises a scanning laser to provide location data relating to the real time position of a brick held by the head, wherein the measurement system uses the location data to produce the position data.

5. The automated brick laying system according to claim 1 wherein the controller controls the head to lay the bricks at respective predetermined locations in a sequence where a complete course of bricks is laid prior to the laying of a brick for a next course of bricks.

6. The automated brick laying system according to claim 1 wherein the head comprises at least one manipulator arranged to grip and lay a brick at its predetermined location and apply adhesive on the building at that predetermined location.

7. The automated brick laying system according to claim 6 wherein the or each manipulator applies adhesive on horizontal and vertical surfaces at the predetermined location.

8. The automated brick laying system according to claim 5 wherein the head comprises first and second manipulators, each manipulator arranged to (a) grip and lay a brick at a predetermined position; and (b) apply adhesive for the brick to be laid.

9. The automated brick laying system according to claim 8 wherein first manipulator applies adhesive for a brick to be laid by the second manipulator, and the second manipulator applies adhesive for a brick to be laid by the first manipulator.

10. The automated brick laying system according to claim 8 wherein, the first and second manipulators apply adhesive at locations which, when a brick is laid, are between vertical faces of that laid brick and a previously laid brick on the same course and a horizontal face of that laid brick and a structure on which the laid brick is supported.

11. The automated brick laying system according to claim 10 wherein, when the manipulators apply adhesive between the vertical faces, one of the manipulators applies a force to the brick being laid in a direction to compress the adhesive between vertical faces of the brick being laid and a previously laid brick.

12. The automated brick laying system according to claim 11 wherein, an other of the manipulators holds the previously laid brick while the compressive force is being applied.

13. The automated brick laying system according to claim 1 further comprising a conveyor system that transports individual bricks from a supply of bricks to the head.

14. The automated brick laying system according to claim 13 further comprising a brick loader that loads bricks from the supply onto the conveyor system.

15. The automated brick laying system according to claim 13 wherein the conveyor system comprises one or more endless loop conveyors.

16. The automated brick laying system according to claim 1 wherein the head further comprises a brick carrying device which hold a supply of bricks to be laid.

17. The automated brick laying system according to claim 1 further comprising a brick cutting device to cut a brick to a shape required for laying at a predetermined location in the building.

18. The automated brick laying system according to claim 17 wherein the cutting device comprises a saw or a guillotine.

19. The automated brick laying system according to claim 17 wherein the cutting device is located distant the head.

20. The automated brick laying system according to claim 1 wherein the robot further comprises a ground engaging base to which the support structure is coupled, and wherein the controller controls the position of the base on the basis of the control data.

21. The automated brick laying system according to claim 20 wherein the controller controls the position of the base to maintain the position of the head in a datum plane for a particular course being laid.

22. The automated brick laying system according to claim 21 wherein the base further comprises one or both of (a) a moveable counterweight and (b) one or more jacks; and wherein the controller controls the position of the base by effecting a movement of the counterweight and/or deployment of one or more the jacks to counteract a bending or twisting moment applied by the support structure to the base.

23. The automated brick laying system according to claim 1 wherein the movable support structure comprise one of the group consisting of a scara arm, a telescopic boom, a gantry or other crane like structure.

24. The automated brick laying system according to claim 1 wherein the moveable support structure is adapted to reach over an entire area of the building being constructed.

25. The automated brick laying system according to claim 1 wherein the non-contact optical line-of-sight position measuring system is selected from an automated total station, a scanning laser, and a combination of the automated total station and the scanning laser.

* * * * *